US008977977B2

(12) United States Patent
Chong et al.

(10) Patent No.: US 8,977,977 B2
(45) Date of Patent: Mar. 10, 2015

(54) METHOD FOR FANNING PAGES OF AN ELECTRONIC BOOK ON A HANDHELD APPARATUS FOR CONSUMING ELECTRONIC BOOKS

(75) Inventors: Kin Fui Chong, Singapore (SG); Teck Tian Willie Png, Singapore (SG)

(73) Assignee: Creative Technology Ltd, Singapore (SG)

( * ) Notice: Subject to any disclaimer, the term of this patent is extended or adjusted under 35 U.S.C. 154(b) by 524 days.

(21) Appl. No.: 12/912,605

(22) Filed: Oct. 26, 2010

(65) Prior Publication Data

US 2012/0102424 A1  Apr. 26, 2012

(51) Int. Cl.
*G06F 3/0483* (2013.01)
*G06F 3/0488* (2013.01)
*G06F 3/0485* (2013.01)

(52) U.S. Cl.
CPC .......... *G06F 3/04883* (2013.01); *G06F 3/0483* (2013.01); *G06F 3/0485* (2013.01)
USPC ........... 715/776; 715/863; 345/473; 345/156; 345/173

(58) Field of Classification Search
CPC .................................................. G06F 3/0483
USPC ........................................................ 715/776
See application file for complete search history.

(56) References Cited

U.S. PATENT DOCUMENTS

| | | | | |
|---|---|---|---|---|
| 5,870,092 A * | 2/1999 | Bedford-Roberts | .......... | 715/776 |
| 5,900,876 A * | 5/1999 | Yagita et al. | .................. | 715/776 |
| 5,909,207 A * | 6/1999 | Ho | .............................. | 345/156 |
| 6,229,502 B1 * | 5/2001 | Schwab | .......................... | 345/1.1 |
| 6,338,503 B1 * | 1/2002 | Hollander | ....................... | 283/62 |
| 7,315,312 B2 * | 1/2008 | Hemmings | .................... | 345/649 |
| D629,413 S * | 12/2010 | Sriver | .......................... | D14/486 |
| 7,898,541 B2 * | 3/2011 | Hong et al. | .................... | 345/473 |
| 8,018,431 B1 * | 9/2011 | Zehr et al. | ..................... | 345/156 |
| 8,098,390 B1 * | 1/2012 | Yacoub et al. | ............... | 358/1.15 |
| 8,286,885 B1 * | 10/2012 | Zehr et al. | ..................... | 235/492 |
| 8,378,979 B2 * | 2/2013 | Frid et al. | ...................... | 345/173 |
| 2004/0162760 A1 * | 8/2004 | Seet et al. | ........................ | 705/14 |
| 2006/0125802 A1 * | 6/2006 | Liang et al. | ................... | 345/173 |
| 2007/0048717 A1 * | 3/2007 | Hsieh | ............................ | 434/317 |
| 2008/0022223 A1 * | 1/2008 | Seet et al. | ...................... | 715/776 |
| 2008/0040378 A1 * | 2/2008 | Stefik et al. | .................... | 707/102 |
| 2008/0077492 A1 * | 3/2008 | Ho et al. | ......................... | 705/14 |
| 2008/0259057 A1 * | 10/2008 | Brons | ........................... | 345/184 |
| 2009/0235162 A1 * | 9/2009 | Nuccio et al. | ................. | 715/255 |
| 2010/0045616 A1 * | 2/2010 | Li et al. | .......................... | 345/173 |
| 2010/0123597 A1 * | 5/2010 | Kitsukawa | .................... | 340/825 |
| 2010/0175018 A1 * | 7/2010 | Petschnigg et al. | ........... | 715/776 |
| 2010/0177033 A1 * | 7/2010 | Chase | ........................... | 345/156 |
| 2010/0324709 A1 * | 12/2010 | Starmen | ........................ | 700/94 |
| 2011/0050594 A1 * | 3/2011 | Kim et al. | ..................... | 345/173 |
| 2011/0248967 A1 * | 10/2011 | Wang et al. | .................... | 345/204 |
| 2011/0307842 A1 * | 12/2011 | Chiang et al. | ................. | 715/863 |
| 2012/0005585 A1 * | 1/2012 | Yum | ............................. | 715/738 |
| 2012/0030040 A1 * | 2/2012 | Seet et al. | .................. | 705/14.73 |

(Continued)

OTHER PUBLICATIONS

Chen et al. "Navigation Technique for dual-display E-Book readers", In Proc of CHI 2008, Apr. 5, 2008.*

*Primary Examiner* — Reza Nabi
(74) *Attorney, Agent, or Firm* — Russell Swerdon; Desmund Gean

(57) ABSTRACT

There is provided a method for fanning pages of an electronic book on a touch panel display of an electronic apparatus for consuming electronic books. The method replicates a user experience similar to fanning pages of a physical book.

13 Claims, 3 Drawing Sheets

(56) References Cited

U.S. PATENT DOCUMENTS

| | | | |
|---|---|---|---|
| 2012/0066591 A1* | 3/2012 | Hackwell | 715/702 |
| 2012/0084704 A1* | 4/2012 | Lee et al. | 715/776 |
| 2012/0084705 A1* | 4/2012 | Lee et al. | 715/776 |
| 2012/0098836 A1* | 4/2012 | Kim et al. | 345/473 |
| 2012/0102425 A1* | 4/2012 | Song | 715/776 |
| 2012/0105464 A1* | 5/2012 | Franceus | 345/581 |
| 2012/0159319 A1* | 6/2012 | Martinoli | 715/273 |
| 2012/0169609 A1* | 7/2012 | Britton | 345/173 |
| 2012/0200487 A1* | 8/2012 | Dvorak et al. | 345/156 |
| 2012/0229451 A1* | 9/2012 | Sim et al. | 345/419 |
| 2013/0127912 A1* | 5/2013 | Lin | 345/659 |
| 2013/0232439 A1* | 9/2013 | Lee et al. | 715/776 |

\* cited by examiner

METHOD FOR FANNING PAGES OF AN ELECTRONIC BOOK ON A HANDHELD APPARATUS FOR CONSUMING ELECTRONIC BOOKS

FIELD OF INVENTION

The present invention relates to the consumption of electronic books, primarily in relation to navigating to various pages of the electronic books.

BACKGROUND

Currently, typical ways used for navigating between the various pages of an electronic book in an electronic book reader include the use of scroll bars, and virtual flipping of pages. It should be noted that the use of scroll bars for navigating between the various pages of an electronic book differs from a typical manner of reading a physical book in various aspects, especially in relation to user experience. In addition, the virtual flipping of pages is merely one typical manner of reading a physical book. There are other manners of navigating between the various pages of a physical book which are currently not replicated when navigating between the various pages of an electronic book, and this causes the navigation between the various pages of an electronic book to be a less intuitive experience for users, which consequently affects how the users comprehend the content of the electronic book.

The less intuitive experience for users is because interaction with the printed material in physical books is a subtle and complicated process for users. Typically, content in physical books is presented in a sequential order, with continuity of content running from page to page, and there may also be a hierarchical structure in the material presented (as the material is organized into chapters, sections, subsections, etc.) where related content is grouped together in a logical manner.

Research has shown that a typical human being inputs data in a sequential manner, and when a book is read from the beginning to the end in a sequential fashion, the brain subsequently recreates a framework of the book contents after reviewing the contents of the book. However, it is quite normal when one does not read a book (input the material involved) from beginning to end because either only an overview of the book is sought (browsing), or only a specific portion(s) of the content are of interest to the user.

Two basic steps are subconsciously carried out by the user during the browsing process. Firstly, the user obtains a cursory view of the contents of the book. Secondly, the user formulates a perception of approximate positions where the content(s) of interest to the user is located so that the user may (a) return to look for them later when desired, and (b) have an understanding of the framework of the book. When browsing the book, many forms of inter-page navigation may be carried out by the user when perusing through the various pages of the book and, together with the inherent sequential order of the pages in the book as published/bound, the user is able to conveniently obtain an understanding of the book.

When using currently available methods of browsing through pages of an electronic book using an electronic book reader as mentioned earlier, it may be necessary to use either an input device or physical touch (in an instance when touch screens are used) to navigate between pages, where hand movements/gestures are necessary to effect the browsing of the pages. Fine control of the hand or fingers may be necessary to effect the browsing of the pages. Such a process would likely tax the user's short term memory ability, which detrimentally affects the user's ability to formulate a perception of approximate positions (the framework) where the content(s) of interest is located.

In view of the aforementioned reason, many people still prefer to hold a physical book in their hands, compared to reading an electronic book using an electronic book reader. This may pertain more to books which are constantly referred to for information compared to books which are consumed from start to end. Hence, it would be desirable if there was a method to read an electronic book using an electronic book reader which would more closely replicate the reading experience of a physical book and is correspondingly able to aid the user's ability to formulate a perception of approximate positions (the framework) where the content(s) of interest is located.

SUMMARY

There is provided a method for fanning pages of an electronic book on a touch panel display of an electronic apparatus for consuming electronic books. The method includes displaying on the touch panel display a first side of the electronic book, the first side including a first page and a view of a thickness of the first side of the electronic book, the thickness of the first side of the electronic book representing a first contact zone; contacting the first contact zone with a pointing object; maintaining contact of the pointing object with the touch panel display at the first contact zone; moving the pointing object towards a first edge of the first contact zone; transmitting first direction page fanning instructions to the electronic apparatus for consuming electronic books; and displaying fanning of pages in the first direction on the touch panel display. It is advantageous that the thickness of the first side of the electronic book is reduced during the fanning of pages in the first direction.

The method may further include displaying on the touch panel display a second side of the electronic book, the second side being of either a side profile of the electronic book or a second page and including a view of a thickness of the second side of the electronic book, the thickness of the second side of the electronic book representing a second contact zone. It is preferable to further include contacting the second contact zone with the pointing object; maintaining contact of the pointing object with the touch panel display at the second contact zone; moving the pointing object towards a second edge of the second contact zone; transmitting second direction page fanning instructions to the electronic apparatus for consuming electronic books; and displaying fanning of pages in a second direction on the touch panel display. It is advantageous that the thickness of the second side of the electronic book is reduced during the fanning of pages in the second direction.

It is advantageous that the thickness of the second side of the electronic book increases when the thickness of the first side of the electronic book is reduced.

Preferably, the first direction is opposite to the second direction. The fanning of pages in the first direction may include showing actual content on each page. Similarly, the fanning of pages in the second direction may also include showing actual content on each page.

The pointing object may preferably be either a stylus pointer, or at least one appendage of a hand.

It is preferable that the first edge of the first contact zone is at an outer end edge of the first side of the electronic book. Similarly, it is preferable that the second edge of the second contact zone is at an outmost end edge of the second side of the electronic book.

The method may further include generating either audio feedback or physical feedback on the electronic apparatus for consuming electronic books during the fanning of pages in either the first direction or the second direction.

The electronic apparatus for consuming electronic books is preferably sized to be handheld. The electronic apparatus for consuming electronic books is a device selected from, for example, a mobile phone, an electronic book reader, a mobile internet device, a portable computing device, any combination of the aforementioned and so forth.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

The following description will be provided on the basis that the present invention is carried out using an electronic apparatus for consuming electronic books, with the electronic apparatus for consuming electronic books being sized to be handheld. The electronic apparatus for consuming electronic books may be a device such as, for example, a mobile phone, an electronic book reader, a mobile internet device, a portable computing device, any combination of the aforementioned and so forth. It should be appreciated that the electronic apparatus for consuming electronic books is not shown in any of the Figures as the electronic apparatus is solely a platform for the invention to be carried out.

Figure 1:
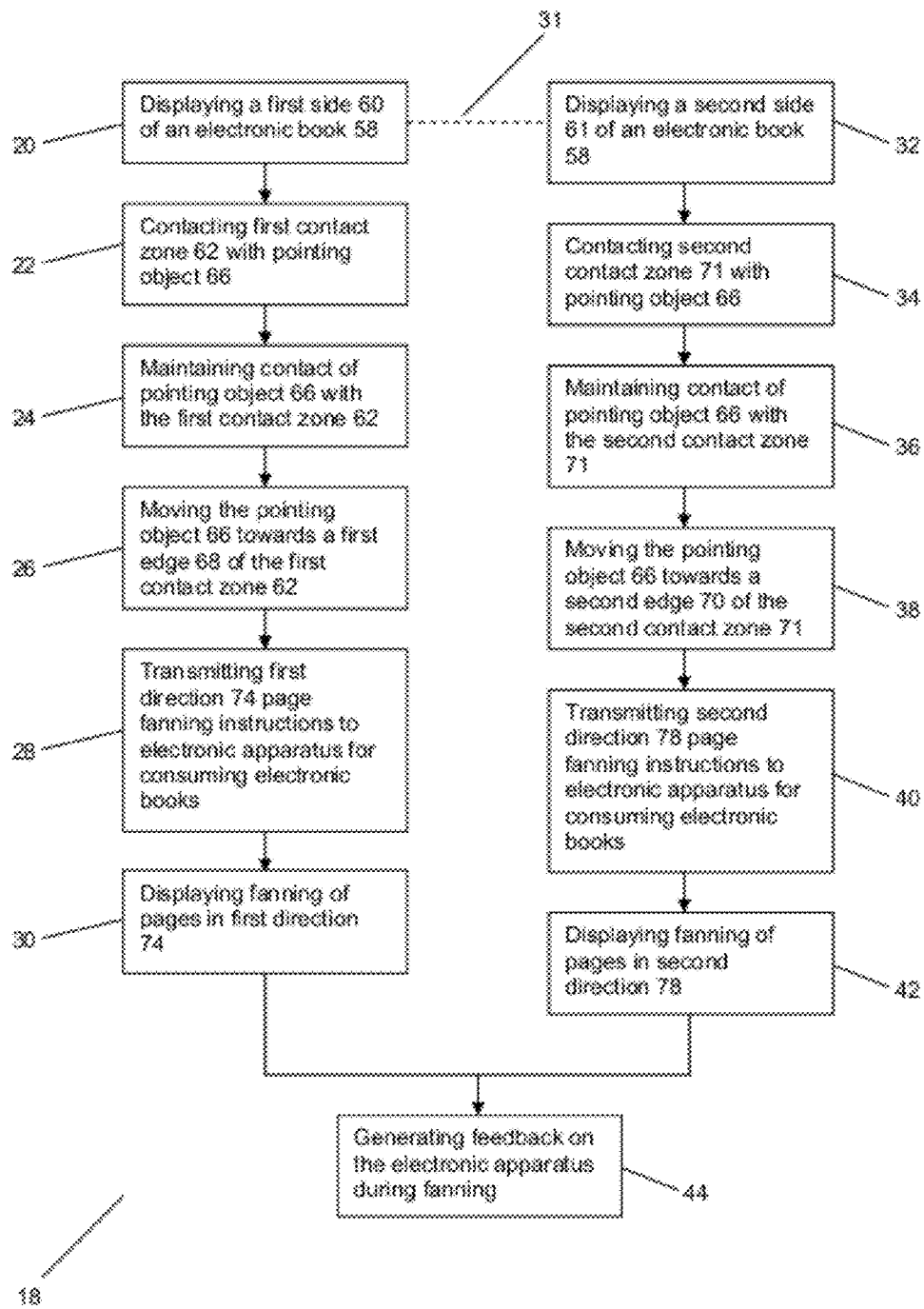
FIG. 1 shows a process flow of a method of the present invention.
Figure 2:
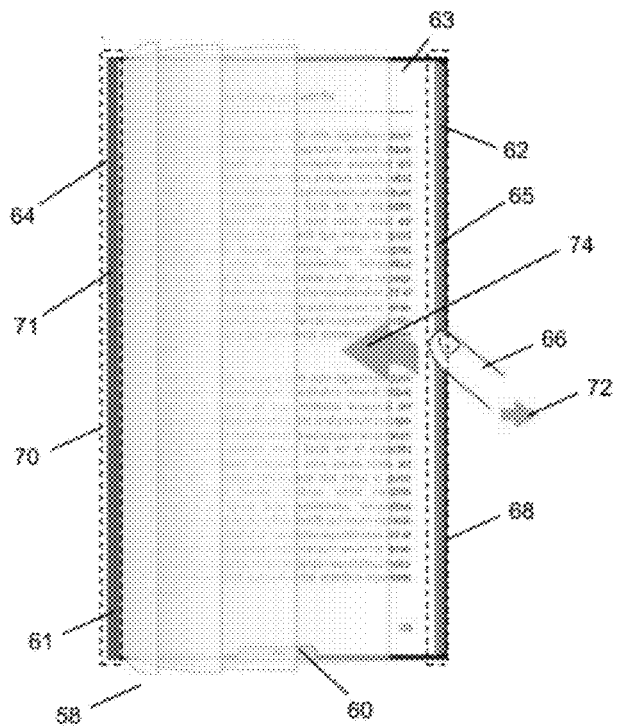
FIG. 2 shows a representative view of a first aspect of the method of FIG. 1.
Figure 3:
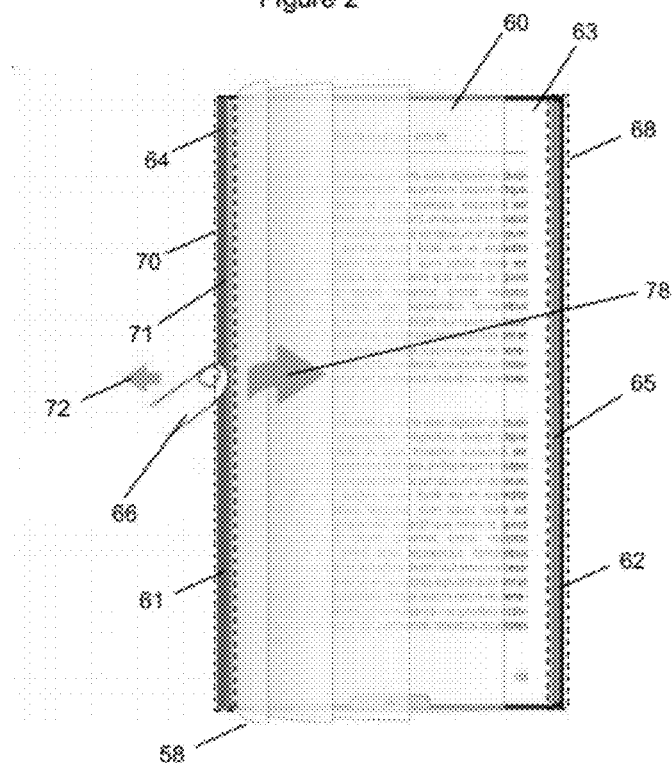
FIG. 3 shows a representative view of a second aspect of the method of FIG. 1.
Figure 4:
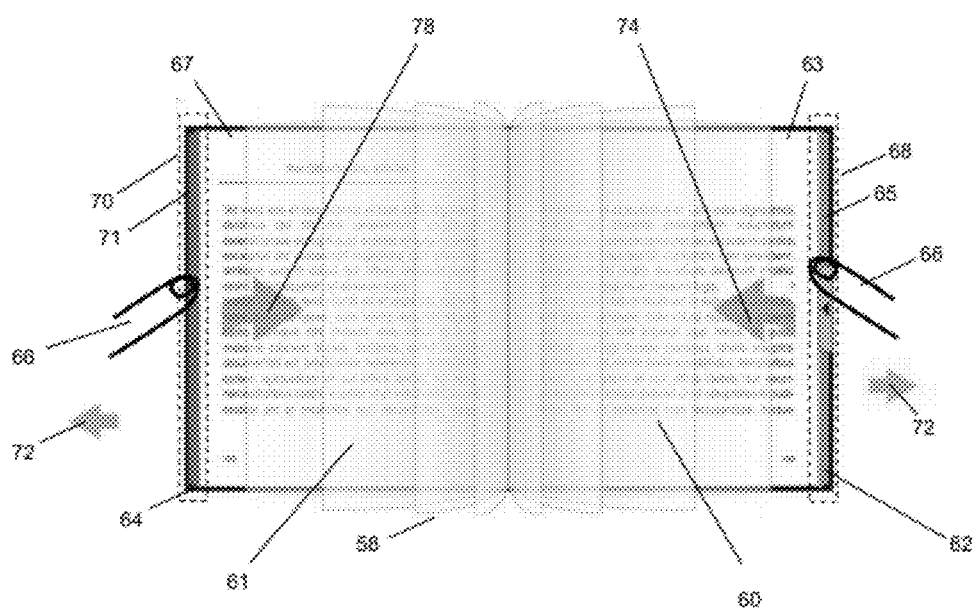
FIG. 4 shows a representative view of a third aspect of the method of FIG. 1.

During the description of the present invention, reference will be made to FIGS. 1-4 whenever necessary. This is because FIG. 1 depicts a process flow of a method of the present invention, and FIGS. 2-4 illustrates various aspects of the method. FIGS. 2-3 depict an electronic book laid out in a portrait orientation on a display while FIG. 4 depicts an electronic book in a landscape orientation on a display. Reference to all the Figures at appropriate junctures of the description would enhance the understanding of the present invention.

Referring to FIG. 1, there is provided a method 18 for fanning pages of an electronic book 58 on a touch panel display of the electronic apparatus for consuming electronic books. The touch panel display may be using either a resistive touch panel or a capacitive touch panel. The touch panel display may include, for example, an OLED display panel, an AMOLED display panel, an LCD display panel, an e-ink display panel and so forth. In addition, the electronic book 58 may be in the form of any file format used for creating and publishing electronic books.

The method 18 includes displaying on the touch panel display a first side 60 of the electronic book 58 (20). It should be appreciated that while the first side 60 is shown to be a right side of the electronic book 58 in FIGS. 2-4, the first side 60 may also be a left side of the electronic book 58. This flexibility allows the electronic book 58 to replicate physical books which are bound either on a left edge or a right edge (which depends on how the content is written and read which differs for different languages). The first side 60 includes a first page 63 and a view of a thickness 65 of the first side 60 of the electronic book 58. The thickness 65 of the first side 60 of the electronic book 58 represents a first contact zone 62. It should be appreciated that while the first contact zone 62 is shown to encompass the thickness 65 of the first side 60, the first contact zone 62 may encompass an area bigger than the thickness 65 of the first side 60 as shown in FIGS. 2-4.

Subsequently, there is contacting of the first contact zone 62 with a pointing object 66 (22). The pointing object 66 may be either a stylus pointer, or at least one appendage of a hand (a finger is shown in FIGS. 2-4). It should be appreciated that the first contact zone 62 may need to be big enough to accommodate the pointing object 66 and able to allow movement of the pointing object 66 within the first contact zone 62. Furthermore, while the first contact zone 62 is denoted within dashed lines in FIGS. 2-4, it is possible that the first contact zone 62 is not defined by visible boundaries of any form. The pointing object 66 should maintain contact with the touch panel display at the first contact zone 62 (24) and the pointing object 66 should be moved towards a first edge 68 of the first contact zone 62 (26). The first edge 68 of the first contact zone 62 is at an outer end edge of the first side 60 of the electronic book 58. The pointing object 66 should be moved in an outwardly direction 72 towards the first edge 68.

Then, the method 18 includes transmitting first direction 74 page fanning instructions to the electronic apparatus for consuming electronic books (28) such that the touch panel display is able to display the fanning of pages in the first direction 74 on the touch panel display (30). The fanning of pages in the first direction 74 may include showing actual content on each page while the pages are fanned. Alternatively, the fanning of pages in the first direction 74 may only include animation of the pages being fanned without showing the actual contents on each page. It should be noted that not showing the actual contents on each page includes, for example, blank pages, pages with random content, and so forth.

During the fanning of the pages in the first direction 74, the electronic apparatus for consuming electronic books may generate either audio feedback or physical feedback (44) which may enhance a user's perception of the fanning of the pages. For example, the audio feedback may be an audio track replicating the sound of the fanning of the pages while the physical feedback may be vibrational movement of the electronic apparatus for consuming electronic books.

In some circumstances 31, a representation of the electronic book 58 may include displaying on the touch panel display a second side 61 of the electronic book 58 (32), the second side 61 being of either a side profile of the electronic book 58 (as shown in FIGS. 2-3) or a second page 67 (as shown in FIG. 4). It should be noted that the second side 61 of the electronic book 58 may not be represented in other circumstances. The second side 61 of the electronic book 58 may include a view of a thickness 64 of the second side 61 of the electronic book 58. The thickness 64 of the second side 61 of the electronic book 58 represents a second contact zone 71. It should be appreciated that while the second contact zone 71 is shown to encompass the thickness 64 of the second side 61, the second contact zone 71 may encompass an area bigger than the thickness 64 of the second side 61 as shown in FIGS. 2-4.

Subsequently, there is contacting of the second contact zone 71 with the pointing object 66 (34). The pointing object 66 may be either a stylus pointer, or at least one appendage of a hand (a finger is shown in FIGS. 2-4). It should be appreciated that the second contact zone 71 may need to be big enough to accommodate the pointing object 66 and able to allow movement of the pointing object 66 within the second contact zone 71. Furthermore, while the second contact zone 71 is denoted within dashed lines in FIGS. 2-4, it is possible that the second contact zone 71 is not defined by visible boundaries of any form. The pointing object 66 should maintain contact with the touch panel display at the second contact zone 71 (36) and the pointing object 66 should be moved towards a second edge 70 of the second contact zone 71 (38). The second edge 70 of the second contact zone 71 is at an outmost end edge of the second side 61 of the electronic book 58. The pointing object 66 should be moved in an outwardly direction 72 towards the second edge 70.

Subsequently, the method 18 includes transmitting second direction 78 page fanning instructions to the electronic apparatus for consuming electronic books (40) such that the touch panel display is able to display the fanning of pages in the second direction 78 on the touch panel display (42). It should be noted that the first direction 74 is opposite to the second direction 78, with the first direction 74 and the second direction 78 sharing a common axis. The fanning of pages in the second direction 78 may include showing actual content on each page while the pages are fanned. Alternatively, the fanning of pages in the second direction 78 may only include animation of the pages being fanned without showing the actual contents on each page. It should be noted that not showing the actual contents on each page includes, for example, blank pages, pages with random content, and so forth.

During the fanning of the pages in the second direction 78, the electronic apparatus for consuming electronic books may generate either audio feedback or physical feedback (44) which may enhance a user's perception of the fanning of the pages. For example, the audio feedback may be an audio track replicating the sound of the fanning of the pages while the physical feedback may be vibrational movement of the electronic apparatus for consuming electronic books.

The method 18 is advantageous as it provides the user with an experience of navigating between pages of an electronic book 58 which enables the user to form a framework of content in the electronic book 58 and aid in understanding contents of the electronic book 58. This is especially so during instances when actual content on each page is shown during the page fanning process. Furthermore, the feedback provided by the electronic apparatus for consuming electronic books and motion of the pointer 66 in the contact zones 62, 71 also helps to replicate the page fanning experience for the user in a manner similar to fanning pages for a physical book. In addition, the user is able to visually view how the thickness 65 of the first side 60 of the electronic book 58 is reduced on a real time basis during the fanning of pages in the first direction 74 (correspondingly, the thickness 64 of the second side 61 of the electronic book 58 increases when the thickness 65 of the first side 60 of the electronic book 58 is reduced) and correspondingly, how the thickness 64 of the second side 61 of the electronic book 58 is reduced on a real-time basis during the fanning of pages in the second direction 78.

Whilst there has been described in the foregoing description preferred embodiments of the present invention, it will be understood by those skilled in the technology concerned that many variations or modifications in details of design or construction may be made without departing from the present invention.

What is claimed is:

1. A method for fanning pages of an electronic book on a touch panel display of an electronic apparatus for consuming electronic books, the method including:
    displaying on the touch panel display a first side of the electronic book, the first side including a first page and a view of a thickness of the first side of the electronic book, the thickness of the first side of the electronic book representing a first contact zone;
    contacting the first contact zone with a pointing object;
    maintaining contact of the pointing object with the touch panel display at the first contact zone;
    moving the pointing object towards a first edge of the first contact zone;
    transmitting first direction page fanning instructions to the electronic apparatus for consuming electronic books in response to the pointing object being moved towards the first edge of the first contact zone; and
    displaying fanning of pages in the first direction on the touch panel display in response to the transmitted first direction page fanning instructions,
    wherein the thickness of the first side of the electronic book is reduced during the fanning of pages in the first direction, and
    wherein actual content on each page is substantially shown while pages are fanned in the first direction and actual content on each page is not shown while pages are fanned in opposite direction of the first direction.

2. The method of claim 1, further including displaying on the touch panel display a second side of the electronic book, the second side being of either a side profile of the electronic book or a second page and including a view of a thickness of the second side of the electronic book, the thickness of the second side of the electronic book representing a second contact zone.

3. The method of claim 2, further including:
    contacting the second contact zone with the pointing object; maintaining contact of the pointing object with the touch panel display at the second contact zone;
    moving the pointing object towards a second edge of the second contact zone;
    transmitting second direction page fanning instructions to the electronic apparatus for consuming electronic books; and
    displaying fanning of pages in a second direction on the touch panel display,
    wherein the thickness of the second side of the electronic book is reduced during the fanning of pages in the second direction.

4. The method of claim 3, wherein the first direction is opposite to the second direction.

5. The method of claim 3, wherein the fanning of pages in the second direction includes showing actual content on each page.

6. The method of claim 3, wherein the second edge of the second contact zone is at an outmost end edge of the second side of the electronic book.

7. The method of claim 3, further including generating audio feedback on the electronic apparatus for consuming electronic books during the fanning of pages in either the first direction or the second direction.

8. The method of claim 2, wherein the thickness of the second side of the electronic book increases when the thickness of the first side of the electronic book is reduced.

9. The method of claim 1, wherein the pointing object is selected from either a stylus pointer, or at least one appendage of a hand.

10. The method of claim 1, wherein the first edge of the first contact zone is at an outer end edge of the first side of the electronic book.

11. The method of claim 1, further including generating either audio feedback or physical feedback on the electronic apparatus for consuming electronic books during the fanning of pages in the first direction.

12. The method of claim 1, wherein the electronic apparatus for consuming electronic books is sized to be handheld.

13. The method of claim 1, wherein the electronic apparatus for consuming electronic books is a device selected from a group comprising: a mobile phone, an electronic book reader, a mobile internet device, a portable computing device, and any combination of the aforementioned.

\* \* \* \* \*